US012777337B2

(12) United States Patent
Kalavakuru et al.

(10) Patent No.: US 12,777,337 B2
(45) Date of Patent: Oct. 27, 2026

(54) PATTERN AND RECEIVE DIVERSITY IN ULTRA-WIDEBAND RADIO SYSTEMS

(71) Applicant: Cisco Technology, Inc., San Jose, CA (US)

(72) Inventors: Sivadeep R. Kalavakuru, Pleasanton, CA (US); Robert C. Badea, Broadview Heights, OH (US); Fred J. Anderson, Lakeville, OH (US); Navid Pourramzangandji, Copley, OH (US)

(73) Assignee: Cisco Technology, Inc., San Jose, CA (US)

( * ) Notice: Subject to any disclaimer, the term of this patent is extended or adjusted under 35 U.S.C. 154(b) by 347 days.

(21) Appl. No.: 18/391,543

(22) Filed: Dec. 20, 2023

(65) Prior Publication Data

US 2025/0212011 A1 Jun. 26, 2025

(51) Int. Cl.
*H04W 16/18* (2009.01)
*H04W 56/00* (2009.01)
*H04W 64/00* (2009.01)

(52) U.S. Cl.
CPC ....... *H04W 16/18* (2013.01); *H04W 56/0035* (2013.01); *H04W 64/00* (2013.01)

(58) Field of Classification Search
CPC . H04W 16/18; H04W 56/0035; H04W 64/00; G01S 5/10; G01S 1/024;
(Continued)

(56) References Cited

U.S. PATENT DOCUMENTS 6,781,544 B2 * 8/2004 Saliga .................... H01Q 21/28 343/876
7,565,169 B1 7/2009 Theobold
(Continued)

FOREIGN PATENT DOCUMENTS

WO WO-2016193897 A1 * 12/2016 ............... G01S 5/14
WO 2023063951 A1 4/2023
(Continued)

OTHER PUBLICATIONS

"Effects of Antenna Orientation in Ultra-Wideband Indoor Positioning System", by Panthip Chansamood, et al., The 16th International Conference on Electrical Engineering/Electronics, Computer, Telecommunications and Information Technology (ECTI-CON 2019) (Year: 2019).*

(Continued)

*Primary Examiner* — Charles C Jiang
*Assistant Examiner* — Margaret Marie Anderson
(74) *Attorney, Agent, or Firm* — Patterson + Sheridan, LLP

(57) ABSTRACT

Techniques for improved pattern and receive diversity in wireless systems are provided. Orientation data for a first access point (AP) of a plurality of APs in an ultra-wideband (UWB) deployment is accessed. An antenna configuration for the first AP is selected based at least in part on the orientation data. A first clock synchronization frame received, from a second AP and based on the antenna configuration, at a first timestamp, the first clock synchronization frame comprising a second timestamp. A clock offset is generated based on the first and second timestamps, and ranging is performed with one or more client devices, in conjunction with the second AP, based at least in part on the clock offset.

20 Claims, 6 Drawing Sheets

(58) Field of Classification Search
CPC .......... G01S 1/026; G01S 1/04; G01S 1/0423; G01S 1/68; G01S 13/86; G01S 13/765; G01S 1/20; H04B 7/0408; H04L 25/0212
See application file for complete search history.

(56) References Cited

U.S. PATENT DOCUMENTS

| | | | | |
|---|---|---|---|---|
| 10,084,529 | B1 * | 9/2018 | Riechers ............ | H04B 7/18506 |
| 2019/0166508 | A1 | 5/2019 | Friday et al. | |
| 2019/0306825 | A1 * | 10/2019 | Lindskog .............. | H04W 24/10 |
| 2022/0140971 | A1 | 5/2022 | Hammerschmidt et al. | |
| 2023/0043248 | A1 | 2/2023 | Huang et al. | |

FOREIGN PATENT DOCUMENTS

| | | | | |
|---|---|---|---|---|
| WO | 2023168158 | A1 | 9/2023 | |
| WO | WO-2023207254 | A1 * | 11/2023 | ........ H04W 56/0035 |
| WO | 2023232981 | A1 | 12/2023 | |

OTHER PUBLICATIONS

Bhattacharya S., et al., "Joint Location Planning and Cluster Assignment of UWB Anchors for DL-TDOA Indoor Localization", 2023 IEEE Wireless Communications and Networking Conference (WCNC), IEEE, Mar. 26, 2023, 6 Pages, XP034340764, DOI: 10.1109/WCNC55385.2023.10118740, Retrieved on May 12, 2023, Abstract Section I.

International Search Report and Written Opinion for International Application No. PCT/US2024/061480, mailed Apr. 4, 2025, 14 Pages.

IEEE 802.1: "P802.1AS-Rev—Timing and Synchronization for Time-Sensitive Applications", Retrieved from https://1.ieee802.org/tsn/802-1as-rev/ on Feb. 1, 2024, 13 Pages.

Sahinoglu Z., et al., "Ultra-wideband Positioning Systems", Cambridge University Press, Sep. 4, 2008, 9 Pages.

Zhao K., et al., "Optimization of Time Synchronization and Algorithms with TDOA Based Indoor Positioning Technique for Internet of Things", Sensors, Nov. 14, 2020, vol. 20, No. 6513, pp. 1-15.

Wikipedia: "Cramér-Rao bound", Last Edited on May 15, 2024, Retrieved From https://en.wikipedia.org/wiki/Cram%C3%A9r%E2%80%93Rao_bound on Oct. 2, 2024, pp. 1-8.

Wikipedia: "Maximum Likelihood Estimation", Last Edited on Aug. 31, 2024, Retrieved from https://en.wikipedia.org/wiki/Maximum_likelihood_estimation on Oct. 2, 2024, pp. 1-18.

* cited by examiner

PATTERN AND RECEIVE DIVERSITY IN ULTRA-WIDEBAND RADIO SYSTEMS

TECHNICAL FIELD

Embodiments presented in this disclosure generally relate to ultra-wideband (UWB) wireless systems. More specifically, embodiments disclosed herein relate to improving pattern and receive diversity in UWB systems.

BACKGROUND

UWB can be used to provide client location and/or ranging services with considerably high accuracy (e.g., to within ten centimeters in line of sight (LOS) cases, and within fifty centimeters in non-LoS (NLoS) cases). Some aspects of UWB systems are defined in the 802.15.4a & 802.15.4z standards. Generally, client ranging is performed based on time of flight (ToF) measurements, which can be performed in two primary ways: two way ranging (TWR) and time difference of arrival (TDoA). TDoA generally requires at least four anchors to do ranging to reach high accuracy, and the ranging accuracy degrades substantially if client is outside the defined region or with NLOS. TWR has similar demerits.

UWB-based location techniques such as ToF and TDoA generally require that the client or asset being tracked communicates through UWB with multiple anchors whose locations are well known, allowing for multilateralization of the client location. These techniques often require that the client be within line of sight and have adequate link budget to communicate with at least three additional anchors to allow for adequate calculation of the location. This limits the usefulness or accuracy of UWB-based ranging in many realistic deployments.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
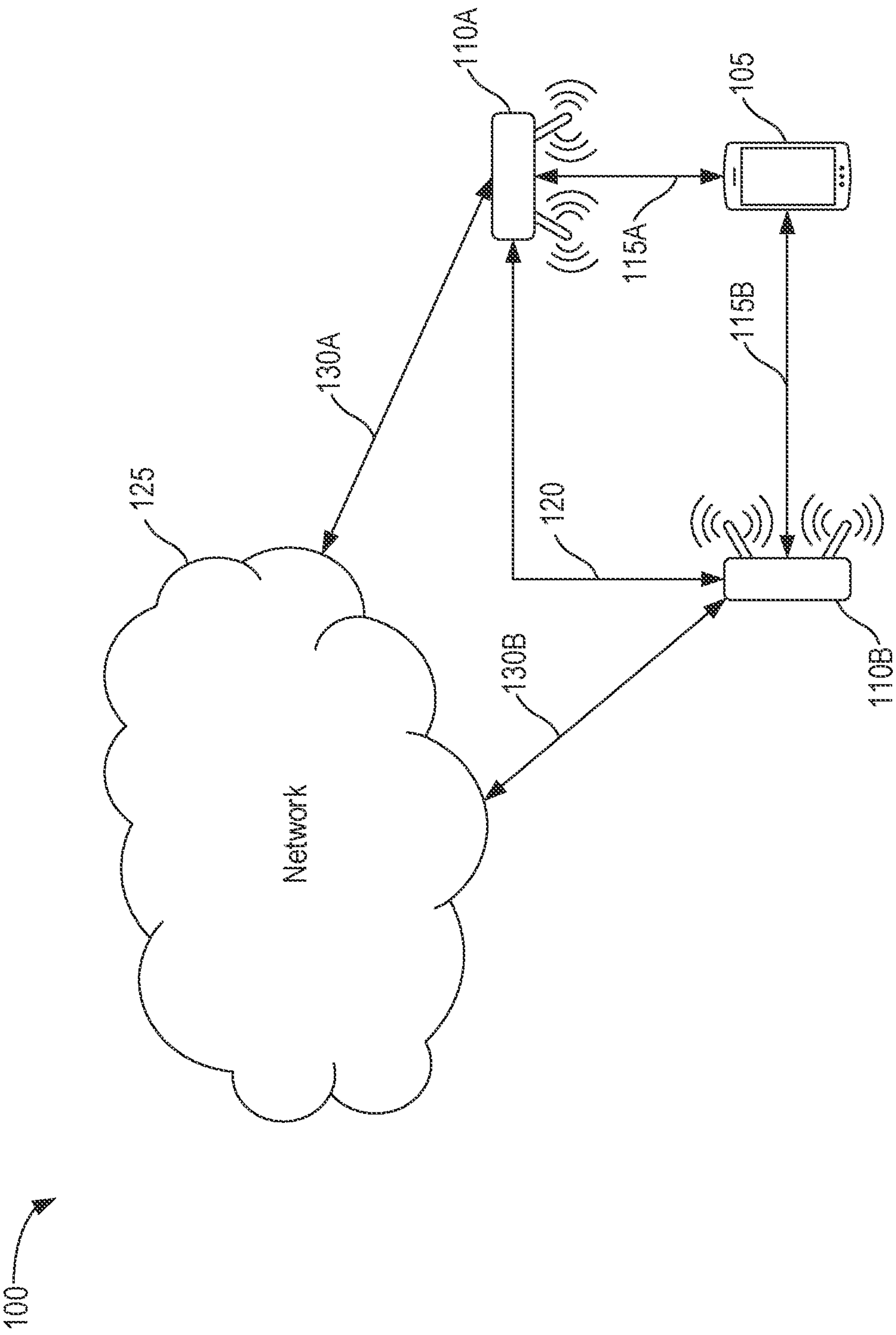
FIG. 1 depicts an example environment for improved receive diversity in wireless radio systems, according to some embodiments of the present disclosure.

One embodiment presented in this disclosure provides a method, comprising: accessing orientation data for a first access point (AP) of a plurality of APs in an ultra-wideband (UWB) deployment; selecting an antenna configuration for the first AP based at least in part on the orientation data; receiving, from a second AP and based on the antenna configuration, a first clock synchronization frame at a first timestamp, the first clock synchronization frame comprising a second timestamp; generating a clock offset based on the first and second timestamps; and performing ranging with one or more client devices, in conjunction with the second AP, based at least in part on the clock offset.

One embodiment presented in this disclosure provides one or more non-transitory computer-readable media comprising computer-executable instructions that, when executed by one or more processors of a processing system, cause the processing system to perform an operation comprising: accessing orientation data for a first access point (AP) of a plurality of APs in an ultra-wideband (UWB) deployment; selecting an antenna configuration for the first AP based at least in part on the orientation data; receiving, from a second AP and based on the antenna configuration, a first clock synchronization frame at a first timestamp, the first clock synchronization frame comprising a second timestamp; generating a clock offset based on the first and second timestamps; and performing ranging with one or more client devices, in conjunction with the second AP, based at least in part on the clock offset.

One embodiment presented in this disclosure provides a system comprising: one or more computer processors; and logic encoded in one or more non-transitory media, the logic collectively executable by operation of the one or more computer processors to perform an operation comprising: accessing orientation data for a first access point (AP) of a plurality of APs in an ultra-wideband (UWB) deployment; selecting an antenna configuration for the first AP based at least in part on the orientation data; receiving, from a second AP and based on the antenna configuration, a first clock synchronization frame at a first timestamp, the first clock synchronization frame comprising a second timestamp; generating a clock offset based on the first and second timestamps; and performing ranging with one or more client devices, in conjunction with the second AP, based at least in part on the clock offset.

EXAMPLE EMBODIMENTS

Embodiments of the present disclosure provide improving pattern and receive diversity in wireless systems.

In many high-density enterprise multi-faceted deployments, TDoA is used as a scalable ranging technique, as it can be used to provide accurate ranging of clients at a relatively high pace. This frequent ranging may be particularly useful or important for operations such as asset tracking in stadiums and other large venues, for automation robots in warehouses, and the like. In many such use cases, multiple anchors or access points (APs) may be mounted on ceilings (e.g., using omnidirectional antenna). In some deployments, anchors and/or APs may additionally or alternatively be mounted on the walls (e.g., using directional antenna) with or without downward tilt of the AP and/or antenna.

In some embodiments, in order to ensure (or improve the probability of) high quality ranging, it can be useful to ensure there is (or provide high probability of there being) a direct line of sight between each anchor. This connection is often used to enable time synchronization among the anchors, which is relied upon for TDoA-based multilateralization. In addition to good connectivity among APs or anchors, it is often preferred to ensure that there is a good line of sight between anchors and potential clients or assets that use the ranging. Therefore, in some embodiments, it may be desirable to design a UWB radio system that can provide harmonious synchronization to communicate clock offsets between coordinator and sub-group anchors for both omnidirectional and directional communications, which may be installed or configured in different planes with respect to each other, as well as in different mounting positions with respect to the client device(s).

In some embodiments of the present disclosure, a wireless radio system is provided which can detect the orientation of anchors and/or APs in a (potentially high density) multi-faceted deployment. Further, embodiments of the present disclosure provide the capability to provide or improve pattern and receive diversity for better coverage and time synchronization across anchors in the deployment, based at least in part on detected orientations. In some aspects, the coordinator or scheduler may have knowledge about the deployment (e.g., about each anchor) in order to initiate optimized ranging depending on the deployment use case. In some embodiments, a clock offset estimation of time sync frames for the particular radio system is also provided.

FIG. 1 depicts an example environment 100 for improved receive diversity in wireless radio systems, according to some embodiments of the present disclosure.

In some embodiments, TDoA location probabilities are generated using four anchors, where the probability may be illustrated as a circle around each anchor (e.g., indicating the predicted distance of the client with respect to each anchor). Generally, the locations are determined based on ToF between the anchor and the client device. In many cases, location accuracy depends largely on peak detection in the delay profile for estimating the time of arrival (ToA) and/or the time of departure (ToD) of each individual ranging event.

As discussed above, in some embodiments, one or more anchors may be mounted on the ceilings of the physical space in order to provide a high probability of direct line of sight with other anchors to enable improved wireless synchronization for TDOA based multilateralization, as well as increasing the probability of good line of sight to potential clients and assets. In many deployments, anchors or APs are also deployed on the wall(s) of the space (with or without down tilt), leading to potential misalignment of coverage between typical ceiling mounted anchors (with omnidirectional coverage) and wall mounted anchors (with directional coverage). Due to this misalignment in coverage in two different planes, as well as a lack of proper synchronization for constant clock offset communication between coordinator and follower anchors, many conventional deployments exhibit poor ranging accuracy in some cases.

In the illustrated environment 100, a number of APs 110A-B (also referred to as anchors in some aspects) are deployed in a physical space. The APs 110 generally provide network connectivity to connected devices (such as the client device 105). That is, the APs 110 provide or enable a wireless network, such as a wireless local area network (WLAN) that enables connectivity among devices connected to the network (e.g., among connected client devices 105) and/or to a broader network 125 (e.g., the Internet).

Specifically, in the illustrated environment 100, a client device 105 may communicate with the AP 110A via link 115A, as well as with the AP 110B via link 115B. Although the illustrated example depicts the client device 105 maintaining two links 115 simultaneously, in some aspects, the client device 105 may be connected or associated to a single AP 110 (via a single link) at a time. Although the illustrated example depicts one client device 105 and two APs 110, in some aspects, there may be any number and variety of client devices 105 and APs 110.

In the illustrated example, the APs 110 are mounted or installed in different configurations in the space. Specifically, the AP 110A is mounted in a vertical orientation (e.g., inverted, on the ceiling of the physical space), while the AP 110B is mounted in a horizontal orientation (e.g., on the wall of the space). In some aspects, as discussed above, wall-mounted APs 110 are often configured using directional antenna (e.g., directing the wireless signal into the room), as use of an omnidirectional antenna may waste substantial energy projecting signal into unused areas (e.g., upwards and into the ceiling). Further, omnidirectional antenna often have a gap or hole directly above the plane of the antenna, which may be angled directly into the physical space for a wall-mounted AP.

Similarly, as discussed above, ceiling-mounted APs 110 are often configured using omnidirectional antenna (e.g., facing downwards, such that the signal propagates in all directions downwards towards the floor of the space), as use of a directional antenna may result in substantial gaps in coverage (e.g., by only covering a small subset of the floor space, where client devices 105 generally are). In some aspects, as discussed above, omnidirectional antenna often have a gap or hole directly above the plane of the antenna, which may result in a spot with relatively poor connectivity directly beneath the AP 110. This can be particularly problematic in venues with high ceilings (e.g., warehouses, stadiums, and the like). In some embodiments, therefore, a ceiling-mounted AP may be configured to use directional antenna(s) to target specific regions in the space. Generally, in some conventional systems, these antenna choices and selections are manually-driven (e.g., where the installer manually selects or configures each AP to use either directional antenna(s), omnidirectional antenna(s), or both).

In the illustrated example, the APs 110 are communicably connected via the link 120. In some aspects, the link 120 may include a wired backhaul connecting the APs 110. In some embodiments, the link 120 may include a wireless connection between the APs 110. For example, in some embodiments, the APs 110 may share time synchronization information wirelessly via the link 120 to enable and/or improve ranging or locationing for client devices 105. In the illustrated example, the APs 110 may additionally provide connectivity to client devices 105 via the network 125 (e.g., using links 130A-B).

In some aspects, as discussed above, the client device 105 may perform ToF-based ranging (e.g., phase difference of arrival (PDoA), TDoA, and the like) to multiple APs 110 to determine the position or location of the client device 105 in the space. In some embodiments, the deployment is a UWB radio system (e.g., operable in Channel 9 (7737.6 MHz to 8236.8 MHz, BW-500 MHz)). In some embodiments, as discussed below in more detail, the system (e.g., each AP 110) can detect the orientation of the APs 110 (e.g., each AP

110 may determine its own deployed orientation). Based on this orientation data, the system may configure the APs 110 to provide harmonious coverage and time synchronization across the APs 110 in the deployment.

In some embodiments, each AP 110 includes an antenna array system having three omnidirectional antenna and one directional (e.g., monopole) antenna. This configuration enables the APs 110 to support wide bandwidth with minimal group delay variation. One example architecture of an AP 110 is discussed in more detail below with reference to FIG. 2.

In some embodiments, each AP 110 has accelerometer or other component that can be used to detect the orientation or attitude of the AP 110. In some embodiments, this orientation component is used to measure or detect the radio deployment position (e.g., ceiling or wall mounted, landscape or portrait orientation, the tilt of the AP 110 (e.g., whether it is tilted down), and the like). In some embodiments, depending on the detected use case or deployment, the radio system can be automatically configured to provide flexible functionality, as discussed in more detail below.

As discussed above and in more detail below, many modern UWB radios (e.g., APs 110) offer multiple receiver paths providing the ability to take advantage of combinatorial signal reception for improved sensitivity and/or spatial receiver diversity enhancement. For many environments (e.g., an office) with relatively low ceiling heights (e.g., equal to or less than 10 feet), ceiling-mounted APs 110 with dual omnidirectional antennas may be used to improve spatial coverage and optimize AP to AP and/or client to AP link budgets. For example, in the illustrated environment 100, the AP 110A may be configured to use dual omnidirectional antennas to serve the client devices 105. As another example, for wall-mounted APs 110 may be configured to use a directional antenna to provide adequate coverage normal to the plane of the AP 110 (e.g., normal to the wall), where most omnidirectional antennas suffer a reduced or null space in their coverage. For example, in the illustrated environment 100, the AP 110B may be configured to use a directional antenna to serve the client devices 105.

However, to facilitate AP-to-AP communication (e.g., for ranging via TWR or wireless synchronization via TDOA) between wall-mounted APs 110, the link budget may be best used via omnidirectional coverage for APs 110 on the same wall. That is, APs 110 mounted on the same wall may have good connectivity among themselves when using omnidirectional antenna, but will have little to no connectivity if using directional antenna.

In some embodiments, therefore, such APs 110 may detect their orientation and place themselves (or be placed) into a diverse receiver mode where the AP 110 receives simultaneously on both one or more omnidirectional antenna (e.g., to facilitate AP-to-AP connectivity) as well as one or more directional antenna (e.g., to facilitate AP-to-client connectivity). This can substantially improve the spatial sensitivity of such APs 110. For example, in response to determining (e.g., based on accelerometer data) that the AP 110B is horizontally mounted (e.g., that it is wall mounted), the AP 110B (or a controller device) may configure the AP 110B to send and/or receive signals via both a directional and an omnidirectional antenna.

In some embodiments, for ceiling-mounted APs 110 on sufficiently high ceilings (e.g., greater than or equal to 60 feet), such as in a warehouse or stadium, an omnidirectional antenna may lack sufficient link budget to serve client devices 105 directly below the AP 110. In some embodiments, therefore, a diverse receiver utilizing the spatial diversity of combining an omnidirectional antenna and a directional antenna may be used to fill that gap in sensitivity. For example, in response to determining (e.g., based on accelerometer data) that the AP 110A is vertically mounted (e.g., that it is ceiling mounted) and that the height of the AP 110A over the floor (or other space where client devices 105 typically exist), the AP 110A (or a controller device) may configure the AP 110A to send and/or receive signals via both a directional and an omnidirectional antenna.

In some aspects, as discussed in more detail below, the radio system (e.g., the APs 110) have knowledge and foresight regarding their deployment use case and orientation(s), and can use this information to to initiate optimized inter-AP communications (e.g., synchronization frames).

In some embodiments, appropriate time synchronization among APs 110 is an important component to enable high precision positioning (e.g., in TDoA based UWB systems). Generally, the clocks should be synchronized between the coordinator AP(s) 110 and any follower AP(s) in the sub-group. In some embodiments, the time or clock synchronization can be formed between the coordinator and each follower in the sub-group in various ways, including by using two-way messaging (e.g., synchronization and response) and/or one way messaging (e.g., using a broadcast frame) with timestamps included (e.g., by the coordinator and/or each sub-group follower).

In some embodiments of the present disclosure, the coordinator AP 110 (which may generally be any AP in the deployment) may send wireless time synchronization frames (including a timestamp of when the frame was sent) using an omnidirectional antenna pattern to provide better coverage between the coordinator AP 110 and each follower AP 110, which may be deployed on the ceiling and/or on the wall(s). That is, the coordinator AP 110 may determine to broadcast synchronization messages using an omnidirectional antenna regardless of the orientation or normal configuration of the coordinator AP 110 (e.g., regardless of whether the AP uses an omnidirectional antenna for other messaging).

In some embodiments, when time synchronization two-way messaging is used, the sub-group follower APs 110 may receive the synchronization frame(s) from the coordinator using a diverse-receive mode, where depending on the orientation and/or location of the follower AP 110 (e.g., ceiling- or wall-mounted), the follower AP 110 will receive the synchronization frames on both an omnidirectional antenna and a directional antenna. That is, follower APs 110 may detect synchronization frames from the coordinator AP 110 on both omnidirectional and directional radio frequency (RF) paths, regardless of whether the follower AP uses both antenna for other messaging.

In some embodiments, after receiving synchronization frames on both RF paths (e.g., corresponding to the omnidirectional antenna(s) and the directional antenna(s)), each follower AP 110 may estimate the channel frequency response (CFR) correlation matrix to find peaks in the delay profile of the first frame arrival. In some embodiments, the follower APs 110 can remove multipath outliers based on analyzing received signal strength indicators (RSSI), removing components or signals with a lower RSSI on both RF paths. This outlier removal can substantially improve the accuracy of the synchronization. In some embodiments, each follower AP 110 may perform channel sounding to estimate its receive sensitivity in dual receiver (e.g., the sensitivity or quality of each RF path—omnidirectional and directional).

In some embodiments, each follower AP 110 can thereby determine the optimum (or better) RF path with respect to its antenna pattern (e.g., omnidirectional or directional) that should be used to respond back to the coordinator AP 110 with its own timestamp. That is, each follower AP 110, after receiving synchronization frame(s) from the coordinator AP 110 via both omnidirectional and directional antenna, may determine which antenna (or combination of antennas) to use when transmitting the response frame(s) to the coordinator AP 110.

In some embodiments where one or more APs 110 are configured to use directional antenna(s) (e.g., stadiums, high-ceiling warehouse, and the like), the follower APs 110 may respond back to the coordinator AP 110 using both omnidirectional and directional paths in order to increase the spatial coverage of the synchronization frames. In this way, client devices 105 which are passively listening in different locations of the space will be able to hear all responses between the coordinator AP 110 and the follower APs 110 at any given point in time (without nulls or gaps caused by suboptimal antenna selection), enabling the client device 105 to find its location accurately and quickly.

In some embodiments, in order to perform time synchronization estimation between the APs 110, the AP(s) 110 may generate clock offset(s) using a maximum likelihood estimation (MLE) to evaluate the timestamp(s) of exchanged synchronization frame(s). For example, in some embodiments, the AP(s) 110 (or a controller) may use a mathematical representation of the timestamps. In some embodiments, the timestamp of when a synchronization message is received by a follower AP 110 may be defined as a function of when the frame was sent by the coordinator AP 110, a fixed delay (e.g., caused by the speed of light for the transmission to propagate to the receiver), and a variable delay (e.g., a variable delay due to the varying channel). For example, in some aspects, the follower APs 110 may use Equation 1 below, where $T_{a1}$ is the timestamp at which a first synchronization frame was received at a follower AP from a coordinator AP over an RF path corresponding to an omnidirectional antenna (O(φ,θ)) during the i-th round or iteration of sending synchronization frames, $T_{m1}$ is the timestamp of when the coordinator AP transmitted the frame, D is a fixed delay (e.g., caused by ToF and speed of light delays), $X_i$ is the variable delay caused by the channel during the i-th iteration, and a is a clock offset (which the follower AP 110 is seeking to determine or compute).

$$[T_{a1}, O(\varphi, \theta), i] = f([T_{m1}, O(\varphi, \theta), i] + D + X_i) + \alpha \qquad \text{Equation 1}$$

Similarly, Equation 2 may be used for a second frame, where $T_{a2}$ is the timestamp at which the second synchronization frame was transmitted by the follower AP, $T_{m2}$ is the timestamp of when the coordinator AP received the second frame, $Y_i$ is a variable delay caused by the channel during the i-th iteration, and a is a clock offset (which the follower AP 110 is seeking to determine or compute).

$$T_{a2}, O(\varphi, \theta), i = f(T_{m2}, O(\varphi, \theta), i - D - Yi) + \alpha \qquad \text{Equation 2}$$

A similar equation may be used for synchronization frames received over a directional antenna by substituting, d(φ,θ) for, O(φ,θ) in the above Equations. In some aspects, after collecting such timestamps over multiple frames, the follower AP 110 may stack the timestamps in a matrix. Depending on whether the fixed delay D is known, the MLE and corresponding Cramér-Rao Bound (CRB) may be used for joint skew. If the system is only evaluating clock offset between a coordinator AP and a single follower AP, then the equations can be simplified according to Equations 3 and 4 below, where Uo(φ,θ),i=(Ta1,O(φ,θ), i–Tm1,O(φ,θ),I) and Vo(φ,θ),i=(Ta2,O(φ,θ),i–Tm2,O(φ,θ),i).

$$Uo(\varphi, \theta), i = D + Xi + \alpha \qquad \text{Equation 3}$$

$$Vo(\varphi, \theta), i = D + Yi - \alpha \qquad \text{Equation 4}$$

As above, a similar equation may be used for synchronization frames received over a directional antenna by substituting, d(φ,θ) for, O(φ,θ) in Equations 3 and 4. In some aspects, it can be assumed that $X_i$ and $Y_i$ are independent and identically distributed zero-mean Gaussian random values. In such cases, the MLE for a (the clock offset) can be determined using Equation 5 below:

$$\alpha = \frac{1}{N}\sum i = 0 \text{ to } N(Uo(\varphi, \theta), i - Vo(\varphi, \theta), i) \qquad \text{Equation 5}$$

In this way, the APs 110 can readily determine an appropriate clock offset a based on the transmission and arrival timestamps of a sequence of two or more synchronization frames transmitted by the coordinator AP 110 over omnidirectional and/or directional antenna.

Figure 2:
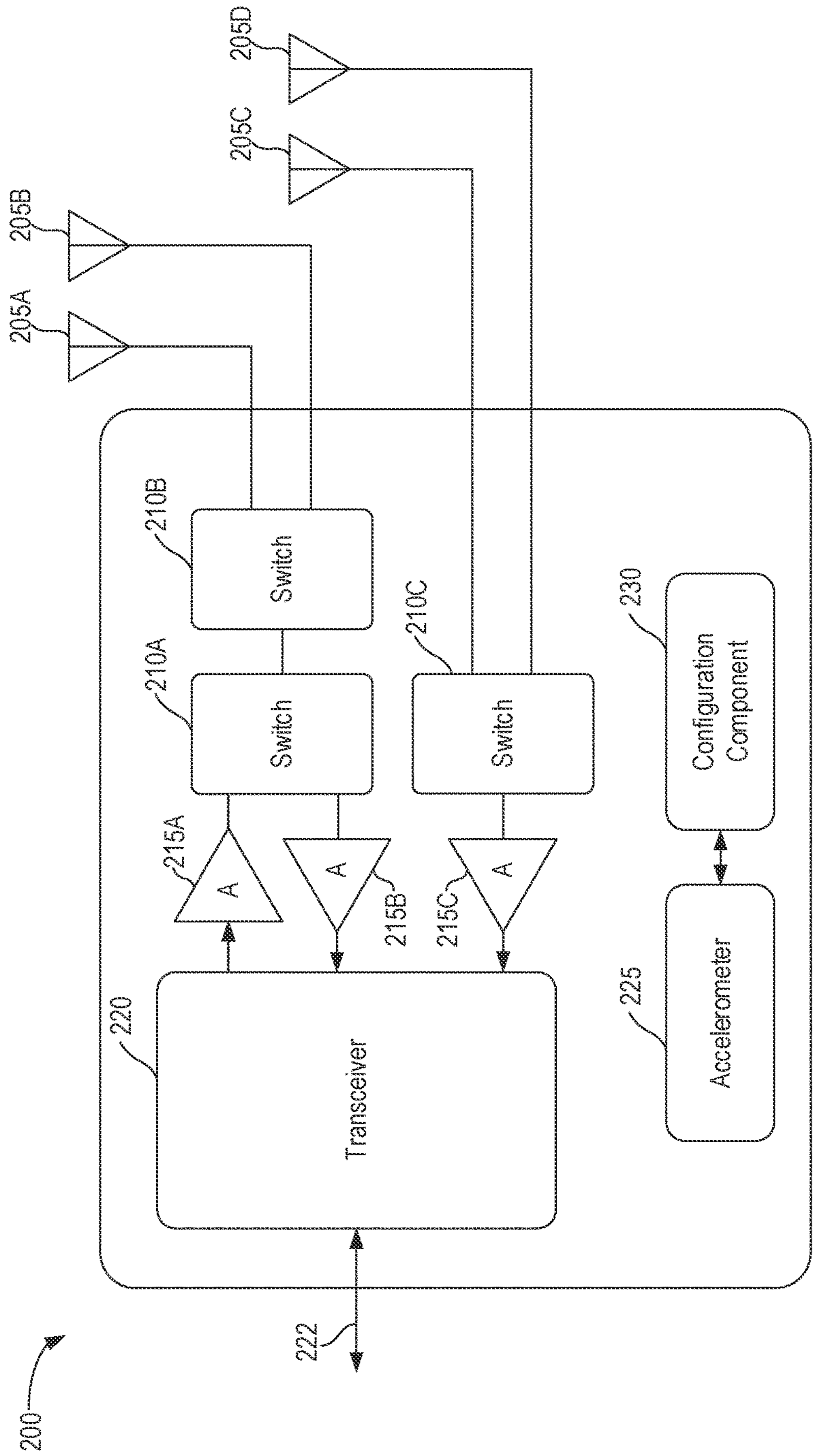
FIG. 2 depicts an example wireless AP for improved receive diversity, according to some embodiments of the present disclosure.

FIG. 2 depicts an example wireless AP 200 for improved receive diversity, according to some embodiments of the present disclosure. In some aspects, the AP 200 corresponds to one of the APs 110 of FIG. 1.

As illustrated, the AP 200 includes four antenna 205A-D, as well as a number of components used to send and receive data. Specifically, the AP 200 includes a transceiver 220 which is used to receive and/or transmit data wirelessly via the antennas. As illustrated by the arrow 222, the actual data that is transmitted by the transceiver 220 may be received from one or more other components (not depicted for conceptual clarity). Similarly, the data received via the transceiver 220 may be provided to one or more other components (not depicted for conceptual clarity).

As illustrated, the transceiver 220 is communicably coupled with one or more switches 210A-C via a set of amplifiers 215A-C. Specifically, the amplifier 215A (which is used to amplify data output by the transceiver 220 for transmission via one or both of the antenna 205A-B) may be a driver amplifier (DA), and the amplifiers 215B-C (which are used to amplify data received via the antennas 205A-D before being processed by the AP 110) may be low-noise amplifiers (LNA).

In some embodiments, one or more of the antenna 205A-D are directional (e.g., monopole antenna) while one or more other antenna 205A-D are omnidirectional. In some embodiments, the directional antenna(s) have a spatial coverage of approximately 90 degrees in elevation and 120 degrees in azimuth (e.g., roughly defining a cone). In some embodiments, the omnidirectional antenna(s) have a spatial coverage of approximately 360 degrees in azimuth (e.g., roughly defining a torus, where the region directly normal to the antenna has little to no signal). For example, in some aspects, the antenna 205A is a directional antenna, and the antennas 205B-D are omnidirectional antennas.

In the depicted example, the AP 200 uses a set of switches 210A-C to control which antenna(s) 205A-D are used for receiving and/or transmitting data at any given time. For example, the switch 210A may be used to select whether data is provided from the amplifier 215A to the switch 210B (e.g., to transmit data from the AP 200), or whether data is provided from the switch 210B to the amplifier 215B (e.g., to receive data at the AP 200). The switch 210B may be used to select whether data is transmitted from the AP 200 via the (directional) antenna 205A or the (omnidirectional) antenna 205B, and/or whether data is received at the AP 200 via the (directional) antenna 205A or the (omnidirectional) antenna 205B. Further, the switch 210C may be used to select whether data is received by the AP 200 via the antenna 205C or the antenna 205D. In some aspects, by using appropriate switch 210 selections, the AP 200 may receive data via both directional and omnidirectional antenna simultaneously. For example, the AP 200 may receive data via the (directional) antenna 205A (using switch 210B) while also receiving data via the (omnidirectional) antenna 205C or 205D.

As discussed above, in some aspects, the AP 200 may determine which antenna(s) to use to send and/or receive data based on the deployment environment of the AP 200 (e.g., based on its orientation and/or height above the floor). In the illustrated example, the accelerometer 225 may be used to provide orientation data to a configuration component 230. The configuration component 230 may then control the switches 210A-C to enable diverse transmit and/or receive using directional and/or omnidirectional antennas.

Figure 3:
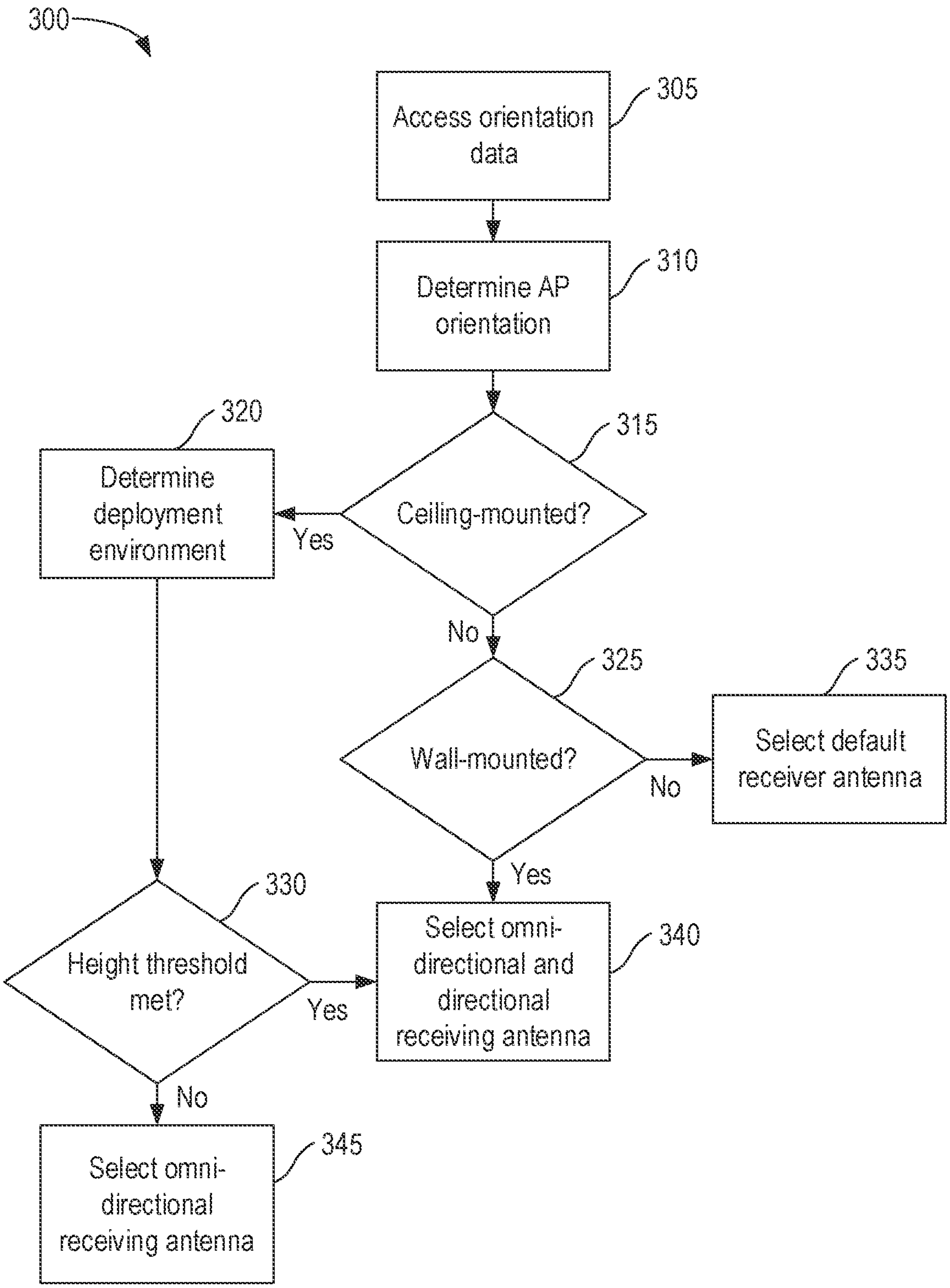
FIG. 3 is a flow diagram depicting an example method for improved antenna diversity, according to some embodiments of the present disclosure.

FIG. 3 is a flow diagram depicting an example method 300 for improved antenna diversity, according to some embodiments of the present disclosure. In some aspects, the method 300 is performed by an AP (such as the AP 110 of FIG. 1 and/or the AP 200 of FIG. 2). In some aspects, the method 300 is performed by a separate device, such as a wireless controller for the deployment to which the AP belongs.

At block 305, the AP accesses orientation data for the AP. As discussed above, the orientation data may generally be any form of data that can be used to determine the deployment or installed orientation of the AP. In some aspects, the orientation data is received via an accelerometer (e.g., accelerometer 225 of FIG. 2).

At block 310, the AP determines the orientation of the AP based on the orientation data. For example, the system may determine whether the AP is wall-mounted (e.g., in a horizontal orientation, such that the antenna(s) are angled horizontally to the ground) or ceiling-mounted (e.g., in a vertical orientation, such that the antenna(s) are angled perpendicular to the ground). In some aspects, a wall-mount with some degree of down-tilt (e.g., such that the antenna are pointed somewhat towards the ground, away from horizontal) may still be classified as a horizontal install.

At block 315, the AP determines whether the AP is ceiling-mounted (e.g., installed with the antenna(s) in an inverted vertical orientation). If so, the method 300 continues to block 320. If not (e.g., if the AP is installed in a horizontal position or non-inverted), the method 300 continues to block 325.

At block 325, the AP determines whether the AP is wall-mounted (e.g., installed with the antenna(s) in a horizontal orientation, or in a down-tilt orientation). If so, the method 300 continues to block 340, where the AP selects or determines to use one or more omnidirectional antenna(s) and one or more directional antenna(s) for receiving time synchronization frames from other AP(s).

Returning to block 325, if the AP determines that the AP is not wall-mounted (e.g., it is installed upright in a non-inverted vertical orientation with the antenna(s) angled perpendicular to and pointing towards the ceiling), the method 300 continues to block 335. At block 335, the AP selects or determines to use a default set of antenna(s) for receiving time synchronization frames from other AP(s). For example, the AP may default to an omnidirectional antenna, or may use whatever setting was manually configured by the installer or administrator.

Returning to block 315 if the AP determines that the AP is ceiling mounted, the method continues to block 320. At block 320, the AP determines or evaluates its deployment environment. Generally, evaluating the deployment environment may include a variety of operations depending on the particular implementation, and generally includes evaluating any criteria or factors that may influence spatial sensitivity of the AP with respect to other AP(s). For example, in some aspects, the AP determines the height at which the AP was installed above a floor (or other space where client devices are likely to be). In some aspects, the height may be determined or inferred based on other information, such as the orientation information, and/or information indicating the venue where the AP is deployed (e.g., indicating that the AP is in a warehouse and is in a ceiling-mounted orientation).

At block 330, the AP determines whether one or more height criteria are satisfied, based on the height threshold. For example, the AP may determine whether it is deployed above a threshold such as sixty feet above the floor. If so, the method 300 continues to block 340, where the AP selects or determines to use one or more omnidirectional antenna(s) and one or more directional antenna(s) for receiving time synchronization frames from other AP(s).

Returning to block 330, if the height threshold is not met, the method 300 continues to block 345, where the AP selects or determines to use an omnidirectional antenna for receiving time synchronization frames from other AP(s).

In this way, using the method 300, the AP may dynamically and automatically determine the optimal receiver antenna pattern to use to improve spatial sensitivity and facilitate time synchronization with other AP(s) in the deployment.

Figure 4:
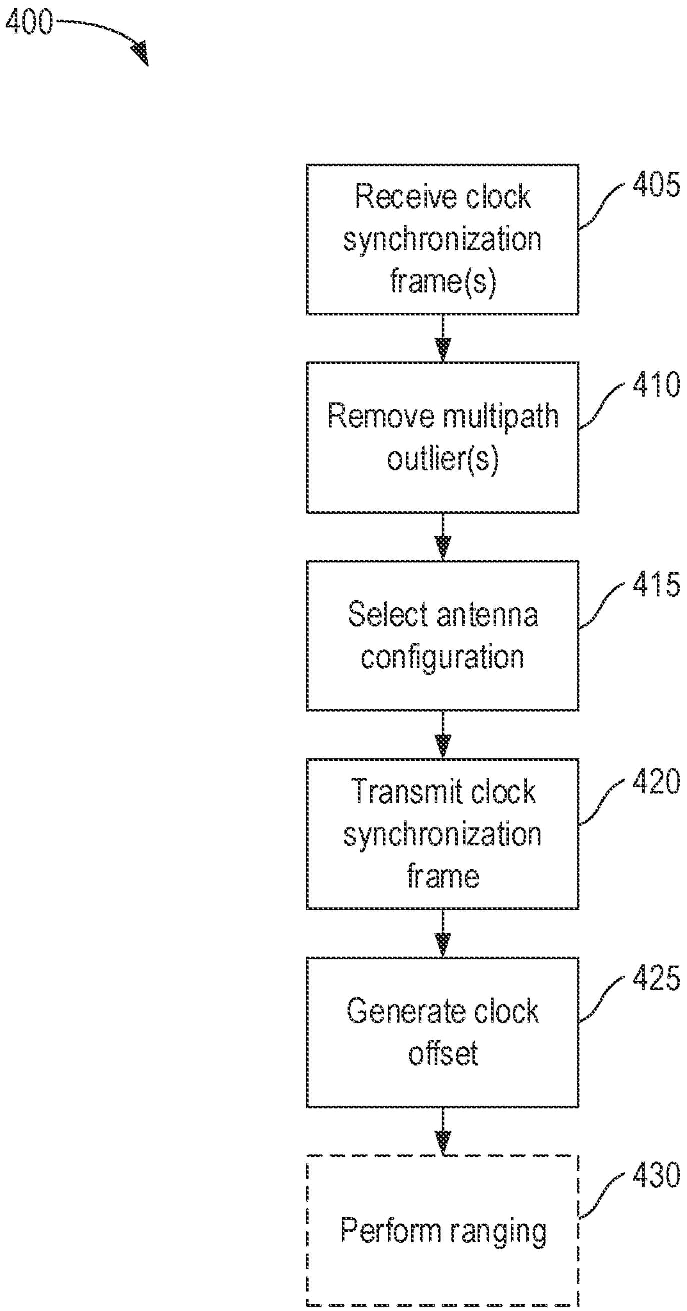
FIG. 4 is a flow diagram depicting an example method for synchronization and ranging, according to some embodiments of the present disclosure.

FIG. 4 is a flow diagram depicting an example method 400 for synchronization and ranging, according to some embodiments of the present disclosure. In some aspects, the method 400 is performed by an AP (such as the AP 110 of FIG. 1 and/or the AP 200 of FIG. 2).

At block 405, the AP receives one or more clock synchronization frames from a coordinator AP. In some aspects, as discussed above, the AP may receive the frame(s) using both an omnidirectional RF path and a directional RF path.

At block 410, the AP removes multipath outliers from the received signal data. For example, as discussed above, the AP may estimate the CFR correlation matrix for each RF path. By evaluating the CFR matrices, the AP can find one or more peaks in the delay profile of the first received frame. In some aspects, the AP may then remove any components of the signal that have a lower RSSI peak in both paths. That is, the AP may identify peak(s) that are lower than the highest peak in each path, and then identify any signal components that have a peak lower than this maximum value on both paths (e.g., that is not the strongest signal on either of the RF paths). These non-peak components in each RF path (in omnidirectional and directional RF paths) may be determined or inferred to be reflected or multipath signals, as the direct or LoS signals should have the earliest and/or highest peak. In some aspects, by removing these outliers, the AP is able to more accurately determine the timestamp of the frame arrival, and thereby determine a more accurate clock offset.

At block 415, the AP selects an antenna configuration for responding to the clock synchronization frame. For example, as discussed above, the AP may perform channel sounding or other evaluations to estimate the receive sensitivity along the omnidirectional and directional antennas, with respect to the received synchronization frame(s).

In some embodiments, based on this evaluation, the AP may determine which antenna configuration (e.g., omnidirectional, directional, or both) should be used to respond back to the coordinator AP. In some embodiments, if the AP is wall-mounted (e.g., has already determined to use both directional and omnidirectional antenna), the AP may respond to the coordinator AP using both omnidirectional and directional paths in order to increase the spatial coverage of the synchronization frames.

At block 420, the AP transmits one or more clock synchronization frames using the selected antenna configuration. In some aspects, the response frames include the timestamp(s) of when one or more synchronization frame(s) were received from the coordinator (e.g., determined after multipath outliers are removed). In some aspects, as discussed above, these timestamp(s) may be used to determine the clock offset between the APs.

At block 425, the AP generates a clock offset based on the timestamps. For example, as discussed above with reference to Equations 1-5, the AP may use a MLE operation to compute or generate the clock offset based on multiple frames. As discussed above, this offset may then be used to synchronize the clock of the follower AP with the coordinator AP (e.g., the offset may be added to or subtracted from the clock of the follower AP when responding to ranging requests).

At block 430, the AP optionally performs ranging with one or more client devices (e.g., the client device 105 of FIG. 1) based at least in part on the clock offset. In this way, the ranging accuracy may be substantially improved, as compared to conventional approaches.

Figure 5:
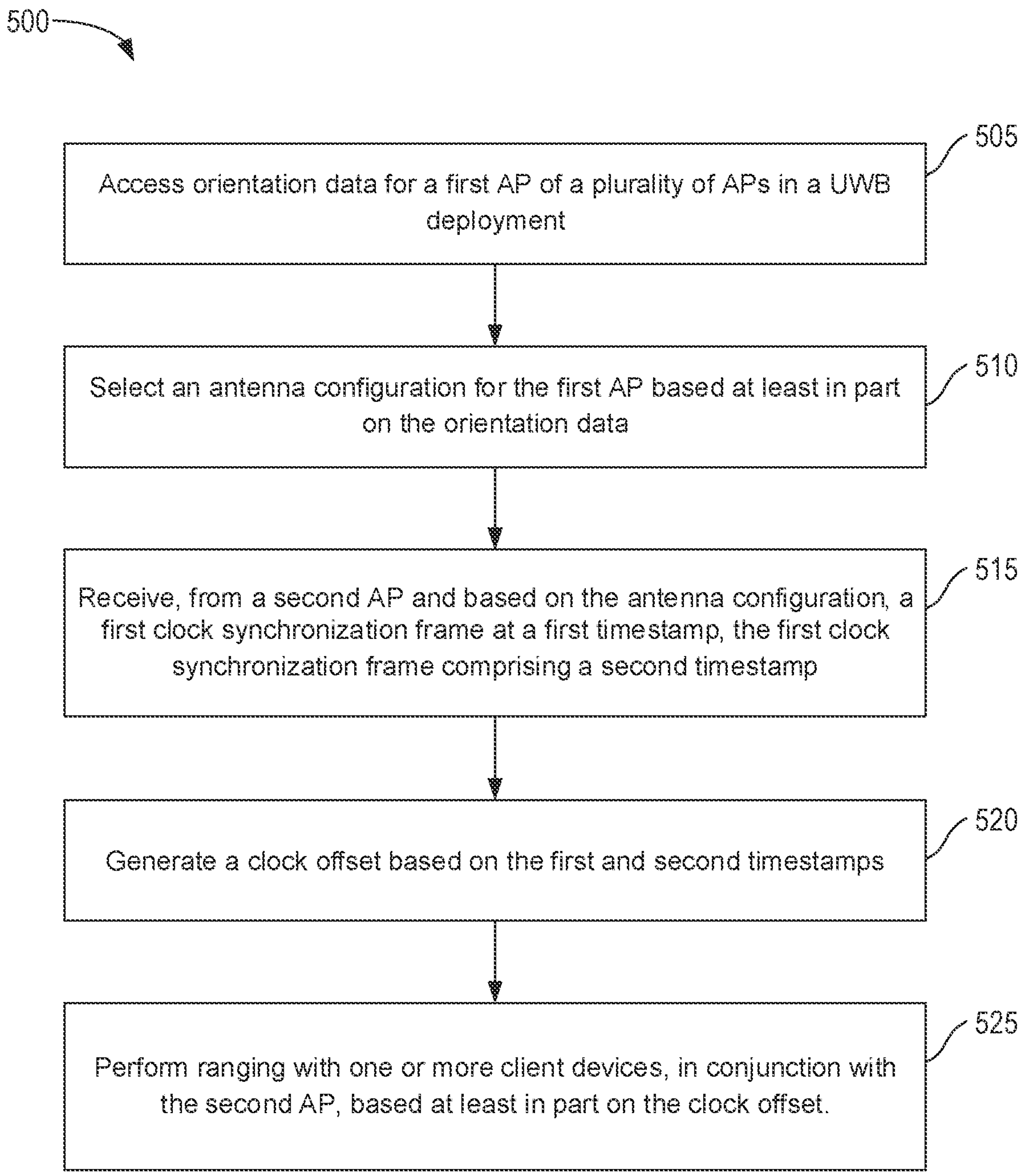
FIG. 5 is a flow diagram depicting an example method for performing UWB ranging, according to some embodiments of the present disclosure.

FIG. 5 is a flow diagram depicting an example method 500 for performing UWB ranging, according to some embodiments of the present disclosure. In some aspects, the method 500 is performed by an AP (such as the AP 110 of FIG. 1 and/or the AP 200 of FIG. 2).

At block 505, orientation data for a first AP (e.g., AP 110 of FIG. 1 and/or AP 200 of FIG. 2) of a plurality of APs in a UWB deployment is accessed.

At block 510, an antenna configuration (e.g., of antennas 205 of FIG. 2) for the first AP is selected based at least in part on the orientation data.

At block 515, a first clock synchronization frame is received, from a second AP and based on the antenna configuration, at a first timestamp, the first clock synchronization frame comprising a second timestamp.

At block 520, a clock offset is generated based on the first and second timestamps.

At block 525, ranging with one or more client devices is performed, in conjunction with the second AP, based at least in part on the clock offset.

Figure 6:
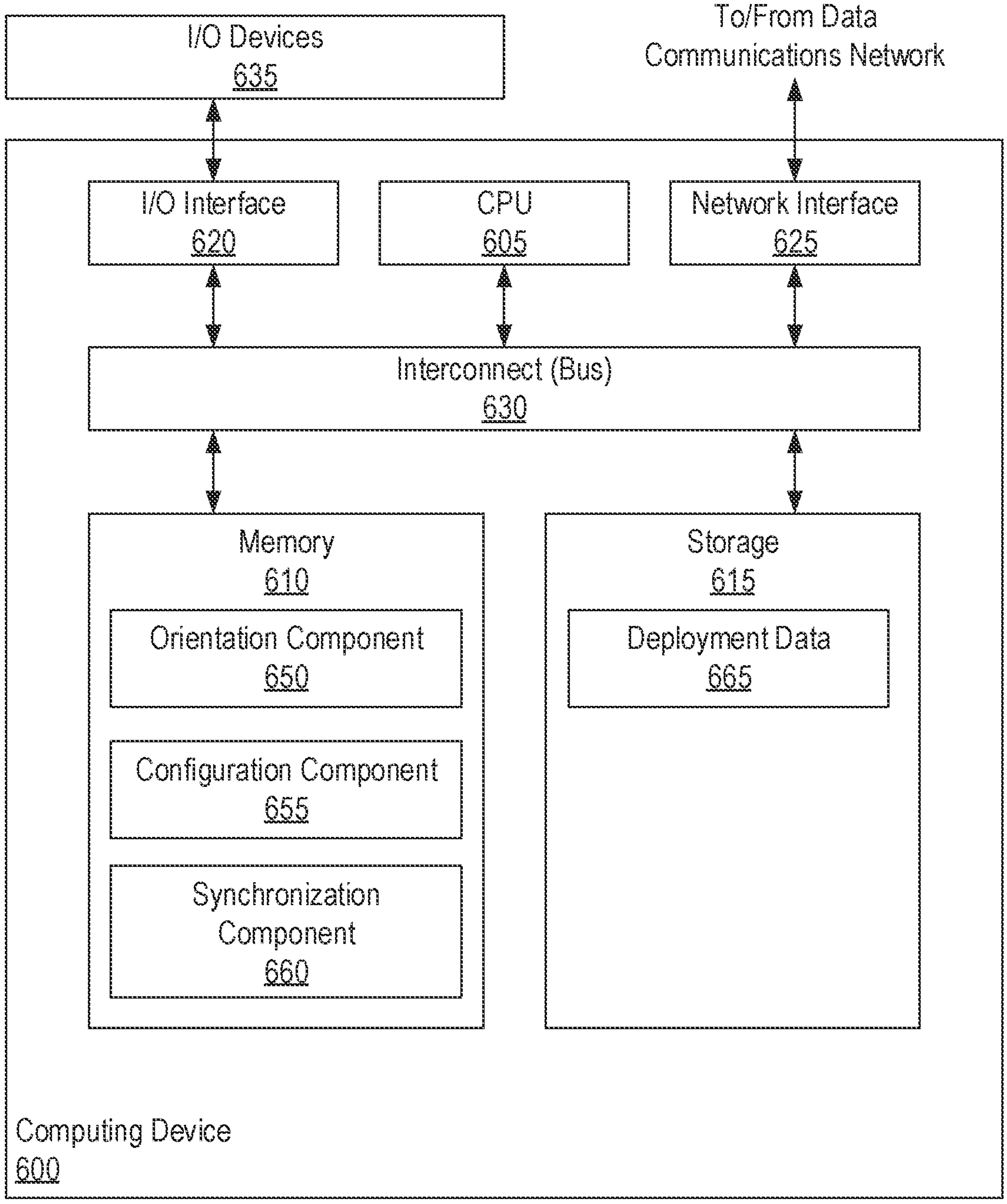
FIG. 6 depicts an example computing device configured to perform various aspects of the present disclosure, according to some embodiments of the present disclosure.

FIG. 6 depicts an example computing device 600 configured to perform various aspects of the present disclosure, according to some embodiments of the present disclosure. Although depicted as a physical device, in embodiments, the computing device 600 may be implemented using virtual device(s), and/or across a number of devices (e.g., in a cloud environment). In one embodiment, the computing device 600 corresponds to an AP (e.g., the AP 110 of FIG. 1 and/or the AP 200 of FIG. 2), and/or to a wireless controller that controls one or more APs.

As illustrated, the computing device 600 includes a CPU 605, memory 610, storage 615, a network interface 625, and one or more I/O interfaces 620. In the illustrated embodiment, the CPU 605 retrieves and executes programming instructions stored in memory 610, as well as stores and retrieves application data residing in storage 615. The CPU 605 is generally representative of a single CPU and/or GPU, multiple CPUs and/or GPUs, a single CPU and/or GPU having multiple processing cores, and the like. The memory 610 is generally included to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 635 (such as keyboards, monitors, etc.) are connected via the I/O interface(s) 620. Further, via the network interface 625, the computing device 600 can be communicatively coupled with one or more other devices and components (e.g., via a network, which may include the Internet, local network(s), and the like). As illustrated, the CPU 605, memory 610, storage 615, network interface(s) 625, and I/O interface(s) 620 are communicatively coupled by one or more buses 630.

In the illustrated embodiment, the memory 610 includes an orientation component 650, a configuration component 655, and a synchronization component 660, which may perform one or more embodiments discussed above. Although depicted as discrete components for conceptual clarity, in embodiments, the operations of the depicted components (and others not illustrated) may be combined or distributed across any number of components. Further, although depicted as software residing in memory 610, in embodiments, the operations of the depicted components (and others not illustrated) may be implemented using hardware, software, or a combination of hardware and software.

The orientation component 650 (which may correspond to the accelerometer 225 of FIG. 2) may generally correspond to any component that can be used to determine or infer the deployed orientation of the computing device 600. For example, the orientation component 650 may evaluate accelerometer data to determine whether the AP is ceiling-mounted, wall-mounted, or in some other arrangement.

The configuration component 655 (which may correspond to the configuration component 230 of FIG. 2) may generally be used to select or control transmit and/or receive configurations of the computing device 600 based at least in part on the orientation data. For example, as discussed above, the configuration component 655 may determine whether to use an omnidirectional antenna, a directional antenna, or both when receiving data (such as synchronization frames) from other AP(s) and/or when transmitting data (such as synchronization responses) to other AP(s).

The synchronization component 660 may generally be used to synchronize the clock of the computing device 600 with the clock of one or more other devices. For example, the synchronization component 660 may be used to generate or determine a clock offset (e.g., based on a sequence of synchronization frames) to synchronize its own clock with a clock of a coordinator device. In some aspects, as discussed above, this clock offset may be used to modify the timestamp or clock of the computing device 600 when responding to ranging requests from client devices, thereby improving prediction accuracy substantially.

In the illustrated example, the storage 615 includes deployment data 665. The deployment data 665 may generally include any information related to the deployment of the computing device 600 and/or one or more other computing devices in the deployment which may be useful in selecting antenna configurations and/or synchronizing clocks across devices. For example, the deployment data 665 may indicate the deployed orientation of the computing device 600, the distance(s) between the computing device 600 and one or more other APs in the space, the height of the computing device 600 above the floor of the space, whether any other AP(s) are deployed on the same wall or in a similar arrangement, and the like.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:

accessing orientation data for a first access point (AP) of a plurality of APs in an ultra-wideband (UWB) deployment;

automatically selecting an antenna configuration for the first AP to use to receive clock synchronization frames based at least in part on the orientation data, comprising selecting use of both an omnidirectional antenna and a directional antenna to receive clock synchronization frames;

receiving, from a second AP and using both the omnidirectional antenna and the directional antenna, a first clock synchronization frame at a first timestamp, the first clock synchronization frame comprising a second timestamp;

generating a clock offset based on the first and second timestamps; and performing ranging with one or more client devices, in conjunction with the second AP, based at least in part on the clock offset.

2. The method of claim 1, wherein accessing the orientation data comprises determining, based on accelerometer data, a deployed orientation of the first AP.

3. The method of claim 1, wherein selecting the antenna configuration comprises determining to use both an omnidirectional antenna and a directional antenna to receive data, based on determining that the first AP is deployed in a horizontal orientation.

4. The method of claim 1, wherein the antenna configuration is further selected based on a deployment environment of the UWB deployment.

5. The method of claim 4, wherein selecting the antenna configuration comprises determining to use both an omnidirectional antenna and a directional antenna to receive data, based on determining that the first AP is deployed in a vertical orientation and that the deployment environment has ceiling above a defined threshold height.

6. The method of claim 1, further comprising transmitting a second clock synchronization frame to the second AP using both an omnidirectional antenna and a directional antenna.

7. The method of claim 1, wherein generating the clock offset comprises:

identifying a highest peak in a delay profile for a signal corresponding to arrival of the first clock synchronization frame; and removing one or more components of the signal corresponding to lower peaks, relative to the highest peak.

8. One or more non-transitory computer-readable media comprising computer-executable instructions that, when executed by one or more processors of a processing system, cause the processing system to perform an operation comprising:

accessing orientation data for a first access point (AP) of a plurality of APs in an ultra-wideband (UWB) deployment;

automatically selecting an antenna configuration for the first AP to use to receive clock synchronization frames based at least in part on the orientation data, comprising selecting use of both an omnidirectional antenna and a directional antenna to receive clock synchronization frames;

receiving, from a second AP and using both the omnidirectional antenna and the directional antenna, a first clock synchronization frame at a first timestamp, the first clock synchronization frame comprising a second timestamp;

generating a clock offset based on the first and second timestamps; and performing ranging with one or more client devices, in conjunction with the second AP, based at least in part on the clock offset.

9. The one or more non-transitory computer-readable media of claim 8, wherein accessing the orientation data comprises determining, based on accelerometer data, a deployed orientation of the first AP.

10. The one or more non-transitory computer-readable media of claim 8, wherein selecting the antenna configuration comprises determining to use both an omnidirectional antenna and a directional antenna to receive data, based on determining that the first AP is deployed in a horizontal orientation.

11. The one or more non-transitory computer-readable media of claim 8, wherein the antenna configuration is further selected based on a deployment environment of the UWB deployment.

12. The one or more non-transitory computer-readable media of claim 11, wherein selecting the antenna configuration comprises determining to use both an omnidirectional antenna and a directional antenna to receive data, based on determining that the first AP is deployed in a vertical orientation and that the deployment environment has ceiling above a defined threshold height.

13. The one or more non-transitory computer-readable media of claim 8, further comprising transmitting a second clock synchronization frame to the second AP using both an omnidirectional antenna and a directional antenna.

14. The one or more non-transitory computer-readable media of claim 8, wherein generating the clock offset comprises:

identifying a highest peak in a delay profile for a signal corresponding to arrival of the first clock synchronization frame; and removing one or more components of the signal corresponding to lower peaks, relative to the highest peak.

15. A system comprising:

one or more computer processors; and logic encoded in one or more non-transitory media, the logic collectively executable by operation of the one or more computer processors to perform an operation comprising:

accessing orientation data for a first access point (AP) of a plurality of APs in an ultra-wideband (UWB) deployment;

automatically selecting an antenna configuration for the first AP to use to receive clock synchronization frames based at least in part on the orientation data, comprising selecting use of both an omnidirectional antenna and a directional antenna to receive clock synchronization frames;

receiving, from a second AP and using both the omnidirectional antenna and the directional antenna, a first clock synchronization frame at a first timestamp, the first clock synchronization frame comprising a second timestamp;

generating a clock offset based on the first and second timestamps; and performing ranging with one or more client devices, in conjunction with the second AP, based at least in part on the clock offset.

16. The system of claim 15, wherein accessing the orientation data comprises determining, based on accelerometer data, a deployed orientation of the first AP.

17. The system of claim 15, wherein selecting the antenna configuration comprises determining to use both an omnidirectional antenna and a directional antenna to receive data, based on determining that the first AP is deployed in a horizontal orientation.

18. The system of claim 15, wherein the antenna configuration is further selected based on a deployment environment of the UWB deployment.

19. The system of claim 18, wherein selecting the antenna configuration comprises determining to use both an omnidirectional antenna and a directional antenna to receive data, based on determining that the first AP is deployed in a vertical orientation and that the deployment environment has ceiling above a defined threshold height.

20. The system of claim 15, further comprising transmitting a second clock synchronization frame to the second AP using both an omnidirectional antenna and a directional antenna.

* * * * *